US012219967B2

(12) United States Patent
Ye et al.

(10) Patent No.: US 12,219,967 B2
(45) Date of Patent: Feb. 11, 2025

(54) SHRIMP PEELING DEVICE

(71) Applicant: DENSEA AQUATIC TECHNOLOGY (HUAZHOU) CO., LTD., Guangdong (CN)

(72) Inventors: Kelei Ye, Guangdong (CN); Chunlei Ye, Guangdong (CN); Yuan Han, Guangdong (CN)

(73) Assignee: DENSEA AQUATIC TECHNOLOGY (HUAZHOU) CO., LTD., Huazhou (CN)

( * ) Notice: Subject to any disclaimer, the term of this patent is extended or adjusted under 35 U.S.C. 154(b) by 157 days.

(21) Appl. No.: 18/149,669

(22) Filed: Jan. 3, 2023

(65) Prior Publication Data

US 2023/0148616 A1 May 18, 2023

Related U.S. Application Data

(63) Continuation of application No. PCT/CN2020/130985, filed on Nov. 24, 2020.

(30) Foreign Application Priority Data

Jul. 13, 2020 (CN) .......................... 202010672985.8

(51) Int. Cl.
*A22C 29/02* (2006.01)
(52) U.S. Cl.
CPC ............ *A22C 29/026* (2013.01); *A22C 29/02* (2013.01); *A22C 29/024* (2013.01)
(58) Field of Classification Search
CPC ..... A22C 29/02; A22C 29/024; A22C 29/025; A22C 29/026

(Continued)

(56) References Cited

U.S. PATENT DOCUMENTS 4,472,858 A * 9/1984 Keith ..................... A22C 29/02
452/150
4,507,825 A * 4/1985 Betts ..................... A22C 29/02
452/2

(Continued)

FOREIGN PATENT DOCUMENTS

CN 111887289 A 11/2020
CN 111958658 A 11/2020

OTHER PUBLICATIONS

International Search Report of PCT Patent Application No. PCT/CN2020/130985 issued on Apr. 14, 2021.

*Primary Examiner* — David J Parsley

(57) ABSTRACT

A shrimp peeling device includes a frame, a driving member, a first conveying wheel, a second conveying wheel, a conveying belt, a clamping frame, a cutting assembly, and a shell removing frame. The conveying belt is in transmission connection with the first conveying wheel and the second conveying wheel. The clamping frame is provided with a first pathway for the conveying belt to pass through. A processing opening is formed in the clamping frame. The cutting assembly is disposed at the processing opening. The shell removing frame is provided with a second pathway for the conveying belt to pass through, and the second pathway includes a limiting cavity and a narrowing cavity. The shell removing frame is provided with a discharge port. The conveying belt is upwards bent and folded in half to clamp and convey a shrimp.

13 Claims, 8 Drawing Sheets

(58) Field of Classification Search
USPC .................................................. 452/2, 5, 9
See application file for complete search history.

(56) References Cited

U.S. PATENT DOCUMENTS

| | | | | |
|---|---|---|---|---|
| 4,703,541 | A * | 11/1987 | Howard | A22C 29/025 |
| | | | | 452/20 |
| 4,996,744 | A * | 3/1991 | Meyer | A22C 29/026 |
| | | | | 452/5 |
| 5,035,669 | A * | 7/1991 | Betts | A22C 29/026 |
| | | | | 452/5 |
| 5,340,353 | A * | 8/1994 | Barlow | A22C 29/026 |
| | | | | 452/9 |
| 7,867,067 | B2 * | 1/2011 | Dancy | A22C 29/026 |
| | | | | 452/5 |
| 8,177,609 | B2 * | 5/2012 | Andersen | A22C 29/028 |
| | | | | 452/1 |
| 8,574,041 | B1 * | 11/2013 | Allain | A22C 29/028 |
| | | | | 452/4 |

* cited by examiner

SHRIMP PEELING DEVICE

CROSS REFERENCE TO RELATED APPLICATIONS

The present application is a Continuation application of PCT Application No. PCT/CN2020/130985 filed on Nov. 24, 2020, which claims the benefit of Chinese Patent Application No. 202010672985.8 filed on Jul. 13, 2020. All the above are hereby incorporated by reference in their entirety.

TECHNICAL FIELD

The present disclosure relates to the technical field of food processing devices, and in particular, to a shrimp peeling device.

BACKGROUND

With the rapid development of transportation, coastal seafood has become quite popular in inland areas. For shrimps, due to the high requirements for feeding and transportation, the transportation cost of live shrimps is high. Therefore, preliminary shrimp peeling and deveining are required. Currently, shrimp processing enterprises focus on processing frozen peeled shrimps and frozen shrimp products.

At present, there are mainly two methods for peeling shrimps: manual peeling and machine peeling. The manual peeling mainly has defects such as slow peeling, low efficiency, and easy hands scratching of production workers by blades during back opening and deveining. The manual peeling is a traditional production method. The machine peeling involves two main methods. One is to use the rotating and rubbing two rollers for peeling. A decapitated shrimp is placed between the two rollers without precise positioning. A shrimp shell is rubbed through multiple rotations of the rollers, such that the shrimp shell is loosened and clamped away by rotating the rollers, and shrimp meat is left. The disadvantages are as follows: raw materials need to be soaked for a long time, the peeling is not thorough, the yield is low, etc. The other is a semi-automatic peeling machine. The decapitated shrimp is manually placed in a tray groove of a conveying belt one by one and then fed into the machine. Through a conveying device, the decapitated shrimp is sequentially subjected to such functional stations as positioning and clamping, back opening, peeling and deveining, thereby peeling the decapitated shrimp. The semi-automatic peeling machine can implement peeling, but the efficiency is low; moreover, the machine can only cut the shrimp and remove the shell, such that the shelled shrimp is incomplete, because shell residues are remained on the shrimp meat. Due to these disadvantages, the existing shrimp peeling mechanical equipment have a small range of application, and cannot be promoted on a large scale.

SUMMARY

The technical problem to be solved by the present disclosure is: how to quickly cut and open the back or abdomen of a shrimp, and perform peeling by squeezing to improve the production efficiency.

To solve the above technical problems, the present disclosure provides a shrimp peeling device, including a frame, a driving member, a first conveying wheel, a second conveying wheel, a conveying belt, a clamping frame, a cutting assembly, and a shell removing frame. The driving member is configured to provide a driving force and mounted on the frame. The first conveying wheel is connected to an output end of the driving member and mounted on the frame. The second conveying wheel is mounted on the frame. The conveying belt is in transmission connection with the first conveying wheel and the second conveying wheel. The clamping frame is provided with a first pathway for the conveying belt to pass through from back to front, a processing opening communicated with the first pathway is formed in a top end of the clamping frame, and when the conveying belt passes through the first pathway, two sides of the conveying belt are relatively bent upward to clamp and convey a shrimp in a vertical state. The cutting assembly is disposed at the processing opening and capable of extending into the first pathway to open the back or abdomen of a shrimp clamped by the conveying belt. The shell removing frame is located on a front side of the clamping frame and provided with a second pathway for the conveying belt to pass through from back to front; the second pathway includes a limiting cavity and a narrowing cavity sequentially communicated from back to front; the narrowing cavity is narrower than the limiting cavity; a discharge port is formed in a top end of the shell removing frame, and the discharge port is located at a connection position between the limiting cavity and the narrowing cavity and communicated with the limiting cavity; and when the conveying belt passes through the connection position between the limiting cavity and the narrowing cavity, the narrowing cavity narrows the conveying belt to squeeze the shrimp to obtain shrimp meat outputted through the discharge port and a shrimp shell carried away through the conveying belt.

As a preferred solution, a longitudinal section of the first pathway is U-shaped.

As a preferred solution, the longitudinal section of the first pathway is V-shaped.

As a preferred solution, viewed along a longitudinal section of the first pathway, the first pathway includes a first cavity and a second cavity sequentially communicated from top to bottom, a width of the first cavity remains substantially the same from top to bottom, and a width of the second cavity gradually decreases from top to bottom.

As a preferred solution, the limiting cavity and the narrowing cavity are connected through a guide surface, and the guide surface is gradually inclined upward from back to front.

As a preferred solution, the cutting assembly includes a first transmission wheel, a connection plate, a second transmission wheel, a transmission belt, and a cutter head. The first transmission wheel is connected to the output end of the driving member. One end of the connection plate is rotatably connected to the output end of the driving member. The second transmission wheel is rotatably connected to the other end of the connection plate. The transmission belt is in transmission connection between the first transmission wheel and the second transmission wheel. The cutter head is mounted on the second transmission wheel.

As a preferred solution, the transmission belt includes a first transmission section and a second transmission section sequentially connected end to end, both the first transmission section and the second transmission section are in transmission connection with the first transmission wheel and the second transmission wheel, and the first transmission section and the second transmission section are arranged in an intersection manner between the first transmission wheel and the second transmission wheel.

As a preferred solution, the cutting assembly is provided with a rotation shaft connected to the second transmission wheel. The cutter head includes a first limiting plate, a first base plate, a cutting knife, a second base plate, and a second limiting plate sequentially arranged along an axial direction of the rotation shaft. A diameter of the first limiting plate and a diameter of the second limiting plate are both larger than a diameter of the first base plate and a diameter of the second base plate, such that an outer edge of the first limiting plate, an outer edge of the second limiting plate, an outer edge of the first base plate, and an outer edge of the second base plate form an annular groove for accommodating an object to be cut. The first base plate and the second base plate are detachably connected to the rotation shaft, and a diameter of the cutting knife is larger than the diameter of the first base plate and the diameter of the second base plate, such that a blade of the cutting knife extends to the annular groove.

As a preferred solution, the diameter of the cutting knife is smaller than the diameter of the first limiting plate and the diameter of the second limiting plate.

As a preferred solution, one end of the rotation shaft is connected to the second transmission wheel, a fixed element is detachably arranged at the other end of the rotation shaft, the first limiting plate is fixedly arranged on the rotation shaft, the second limiting plate is detachably connected to the rotation shaft, and the second limiting plate abuts against the fixed element.

Compared with the prior art, the shrimp peeling device provided by the present disclosure has the following beneficial effects:

In the present disclosure, through the first pathway inside the clamping frame, the conveying belt is upwards bent and folded in half to clamp and convey the shrimp, and the shrimp can be kept in the vertical state. When the shrimp to be processed passes through the processing opening, the cutting assembly rotates to cut the back or abdomen of the shrimp, and the cut shrimp is conveyed to the shell removing frame. When the shrimp reaches the narrowing cavity through the limiting cavity, the narrowing cavity narrows the conveying belt, which squeezes the shrimp through a frictional force, such that the shrimp meat slides out from the shrimp shell, and then the shrimp meat is discharged from the discharge port. The conveying belt carries the shrimp shell away to obtain the peeled shrimp. It is not necessary to precisely determine the position of each shrimp. Therefore, the device has such advantages as simple structure and high production efficiency.

REFERENCE NUMERALS

Figure 1:
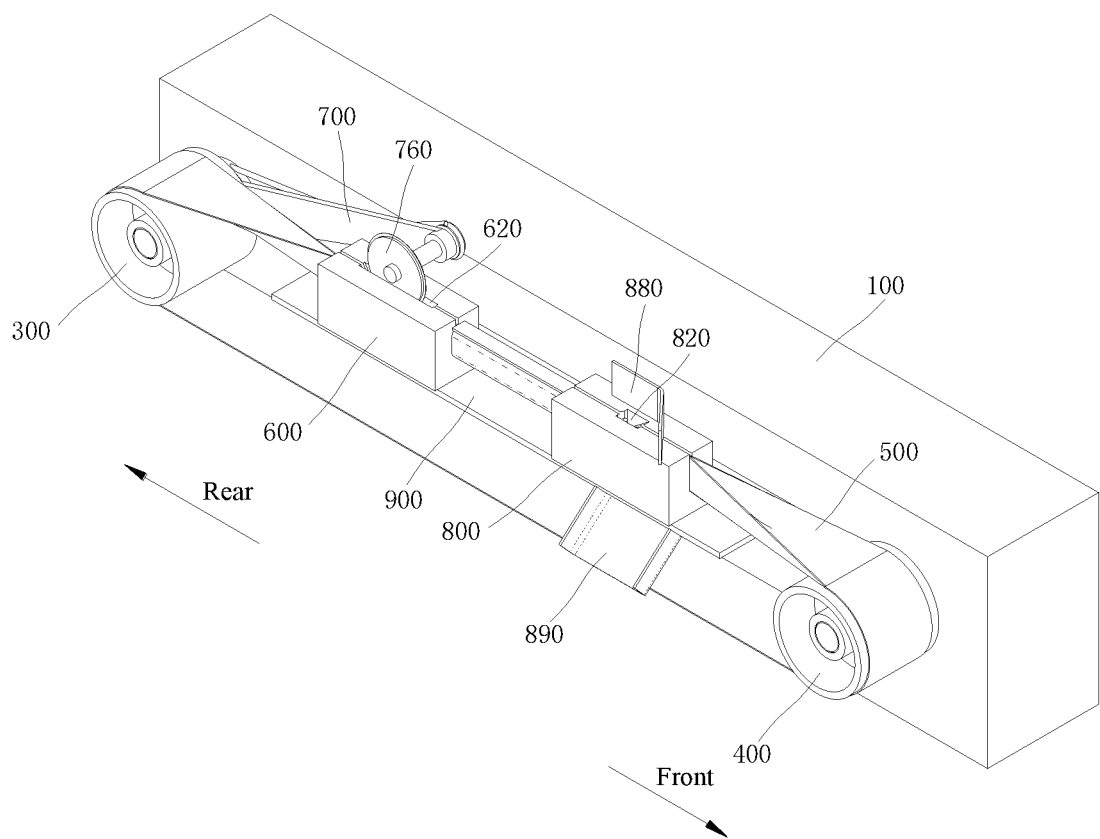
FIG. 1 is a schematic diagram of an overall structure of a shrimp peeling device according to a preferred embodiment of the present disclosure.

100. Frame;
200. Driving member; 210. Output end;
300. First conveying wheel; 400. Second conveying wheel; 500. Conveying belt;
600. Clamping frame; 610. First pathway; 611. First cavity; 612. second cavity; 620. Processing opening; 630. First side wall surface; 640. Second side wall surface; 650. Arc wall surface; 660. First top wall surface; 670. Second top wall surface;
700. Cutting assembly; 710. First transmission wheel; 720. Connection plate; 730. Second transmission wheel; 740. Rotation shaft; 750. Transmission belt; 751. First transmission section; 752. Second transmission section; 760. Cutter head; 761. First limiting plate; 762. First base plate; 763. Cutting knife; 764. Second base plate; 765. Second limiting plate; 766. Annular groove; 767. Fixed element; 768. First arc surface; 769. Second arc surface;
800. Shell removing frame; 810. Second pathway; 811. Limiting cavity; 812. Narrowing cavity; 820. Discharge port; 830. Guide surface; 840. Third side wall surface; 850. Fourth side wall surface; 860. Fifth side wall surface; 870. Sixth side wall surface; 880. Guide plate; 890. Collection plate;
900. Support plate.

DETAILED DESCRIPTION

The specific implementations of the present disclosure are described in more detail below with reference to the accompanying drawings and examples. The following embodiments are illustrative of the present disclosure and should not be construed as limiting of the scope of the present disclosure.

It should be understood that in the description of the present disclosure, orientations or positional relationships indicated by terms such as "upper", "lower", "front", "rear", "left", "right", "vertical", "horizontal", "top", "bottom", "inside" and "outside" are all based on what are illustrated in the drawings, and such terms are used herein for ease and simplification of description of the present disclosure rather than indicating or implying that the stated device or element must have a specific orientation or must be constructed and operated in a specific orientation, and thus cannot be construed as limitations to the present disclosure.

It should be understood that in the description of the present disclosure, the terms "interconnection", "connection" and "fixation" etc. are intended to be understood in a broad sense. For example, the "connection" may be a fixed connection, removable connection or integral connection; may be a mechanical connection or welding connection; may be a direct connection or indirect connection using a medium; and may be a communication or interaction between two elements, unless otherwise clearly specified and limited. Those of ordinary skill in the art may understand specific meanings of the above terms in the present disclosure based on a specific situation.

Figure 2:
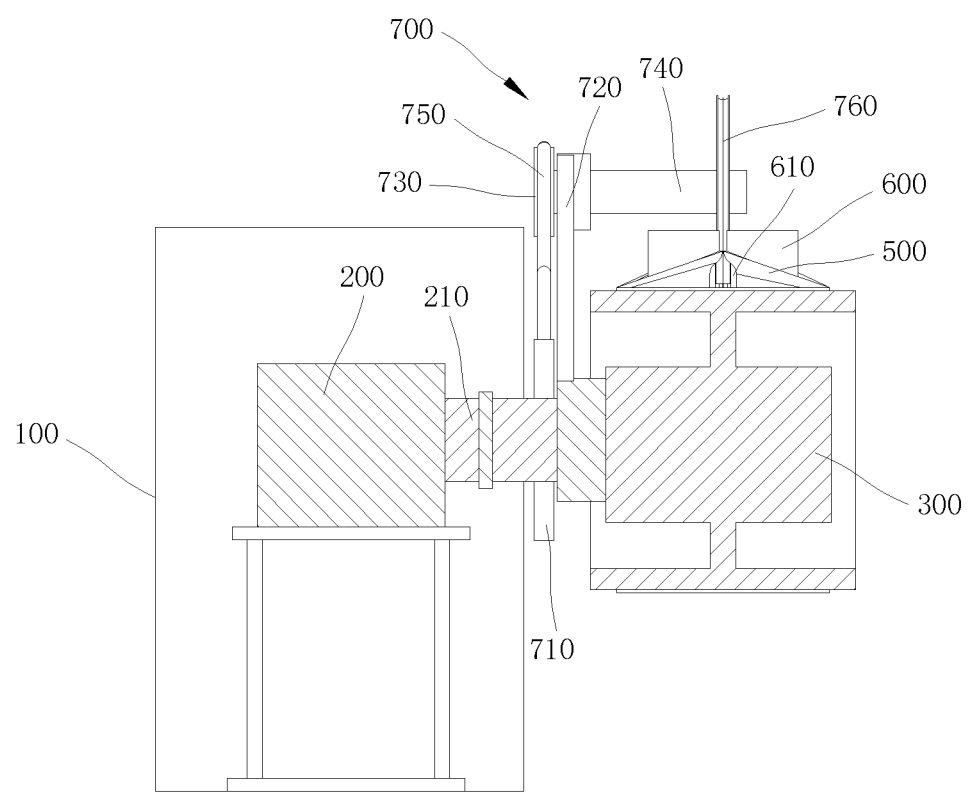
FIG. 2 is a schematic diagram of an internal structure from another perspective of FIG. 1.

As shown in FIG. 1 and FIG. 2, a preferred embodiment of the present disclosure provides a shrimp peeling device, including a frame 100, a driving member 200, a first conveying wheel 300, a second conveying wheel 400, a conveying belt 500, a clamping frame 600, a cutting assembly 700, and a shell removing frame 800. The driving member 200 is configured to provide a driving force and mounted on the frame 100. The first conveying wheel 300 is connected to an output end of the driving member 200 and mounted on the frame 100. The second conveying wheel 400 is mounted on the frame 100. The conveying belt 500 is in transmission connection with the first conveying wheel 300 and the second conveying wheel 400. The clamping frame 600 is provided with a first pathway 610 for the conveying belt 500 to pass through from back to front, a processing opening 620 communicated with the first pathway 610 is formed in a top end of the clamping frame 600, and when the conveying belt 500 passes through the first pathway 610, two sides of the conveying belt 500 are relatively bent upward to clamp and convey a shrimp in a vertical state. The cutting assembly 700 is disposed at the processing opening 620 and capable of extending into the first pathway 610 to open the back or abdomen of a shrimp clamped by the conveying belt 500. The shell removing frame 800 is located on a front side of the clamping frame 600 and provided with a second pathway 810 for the conveying belt 500 to pass through from back to front; the second pathway 810 includes a limiting cavity 811 and a narrowing cavity 812 sequentially communicated from back to front; the narrowing cavity 812 is narrower than the limiting cavity 811; a discharge port 820 is formed in a top end of the shell removing frame 800, and the discharge port 820 is located at a connection position between the limiting cavity 811 and the narrowing cavity 812 and communicated with the limiting cavity 811; and when the conveying belt 500 passes through the connection position between the limiting cavity 811 and the narrowing cavity 812, the narrowing cavity 812 narrows the conveying belt 500 to squeeze the shrimp to obtain shrimp meat outputted through the discharge port 820 and a shrimp shell carried away through the conveying belt 500.

According to the shrimp peeling device based on the above technical features, through the first pathway 610 inside the clamping frame 600, the conveying belt 500 is upwards bent and folded in half to clamp and convey the shrimp, and the shrimp can be kept in the vertical state. When the shrimp to be processed passes through the processing opening 620, the cutting assembly 700 rotates to cut the back or abdomen of the shrimp, and the cut shrimp is conveyed to the shell removing frame 800. When the shrimp reaches the narrowing cavity 811 through the limiting cavity 812, the narrowing cavity 812 narrows the conveying belt 500, which squeezes the shrimp through a frictional force, such that the shrimp meat slides out from the shrimp shell, and then the shrimp meat is discharged from the discharge port 820. The conveying belt 500 carries the shrimp shell away to obtain the peeled shrimp. It is not necessary to precisely determine the position of each shrimp. Therefore, the device has such advantages as simple structure and high production efficiency.

Figure 3:
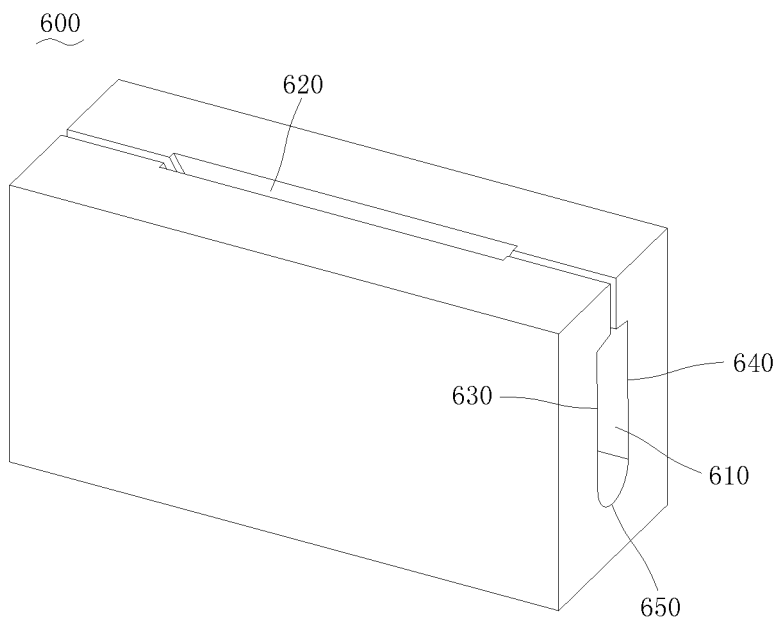
FIG. 3 is a stereoscopic schematic structural diagram of a clamping frame in a shrimp peeling device according to a preferred embodiment of the present disclosure.
Figure 4:
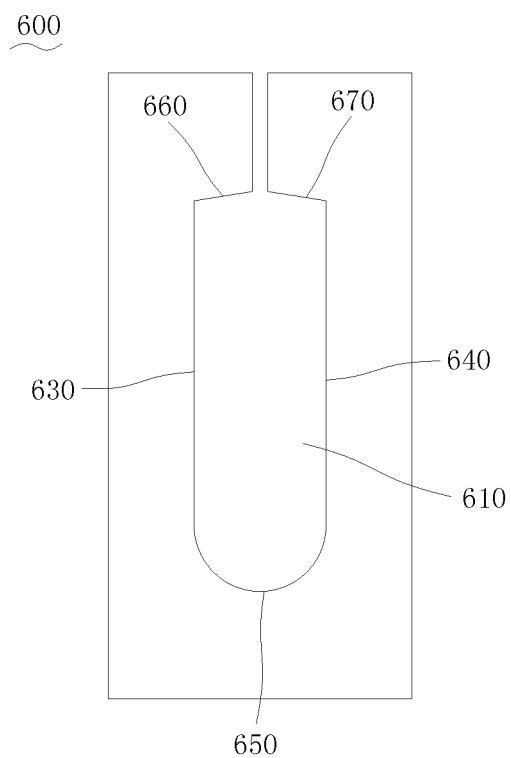
FIG. 4 is a cross-sectional side view of a clamping frame in a shrimp peeling device according to a preferred embodiment of the present disclosure.

In this embodiment, as shown in FIG. 3 and FIG. 4, a longitudinal section of the first pathway 610 is U-shaped. That is, a first side wall surface 630 and a second side wall surface 640 are provided inside the clamping frame 600. The first side wall surface 630 and the second side wall surface 640 are relatively arranged to define the first pathway 610. The first side wall surface 630 is parallel to the second side wall surface 640, and a bottom end of the first side wall surface 630 is connected to a bottom end of the second side wall surface 640 through an arc wall surface 650, such that the first side wall surface 630, the second side wall surface 640, and the arc wall surface 650 form the U-shaped first pathway 610. The first conveying wheel 300 and the second conveying wheel 400 tension the conveying belt 500, the shrimp is flatly placed on the conveying belt 500, and when the shrimp is conveyed to the clamping frame 600, the flatly placed shrimp can be clamped vertically under the action of the first side wall surface 630 and the second side wall surface 640, and is conveyed along with the conveying belt 500. Moreover, the shrimp is squeezed by the conveying belt 500 to be straightened for convenient opening of the back or abdomen by cutting, thereby positioning and conveying the shrimp in an oriented vertical state of back upward and abdomen downward, or back downward and abdomen upward, and providing an accurate positioning attitude for operation steps of back opening, deveining, etc. in shrimp processing. The conveying belt 500 employs a soft flat belt, such as a PVC belt and a nylon belt.

Figure 5:
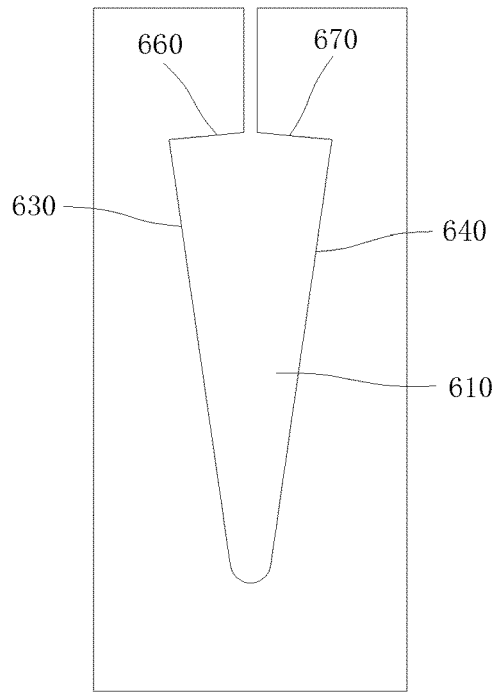
FIG. 5 is a cross-sectional side view of a clamping frame in a shrimp peeling device according to a second embodiment of the present disclosure.
Figure 10:
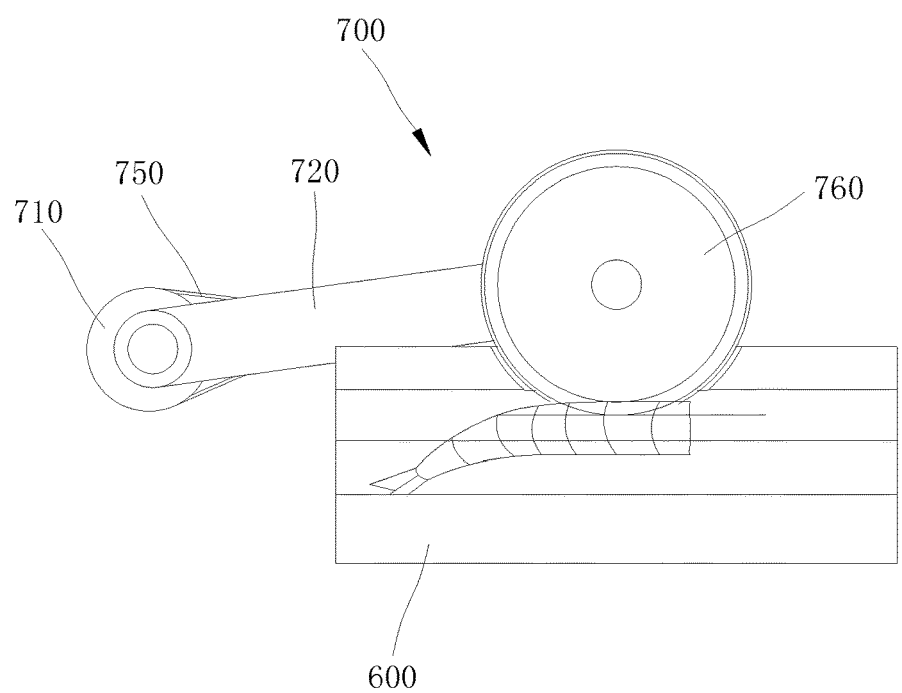
FIG. 10 is a schematic diagram of a working state of a cutting assembly in a shrimp peeling device according to a preferred embodiment of the present disclosure.
Figure 11:
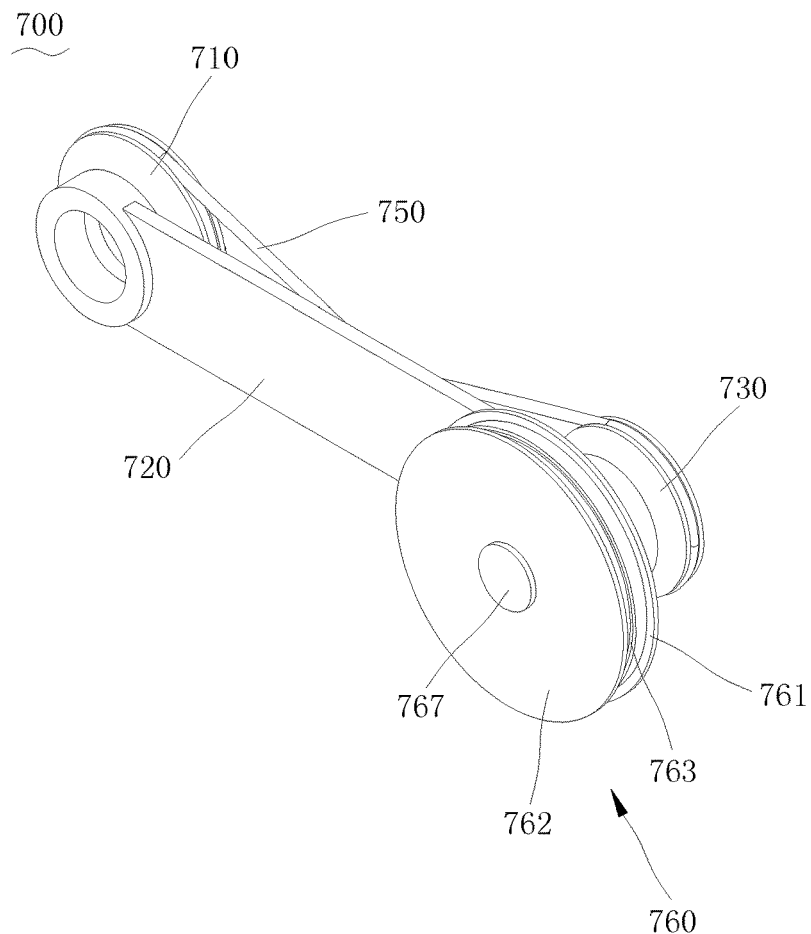
FIG. 11 is a stereoscopic schematic structural diagram of a cutting assembly in a shrimp peeling device according to a preferred embodiment of the present disclosure.
Figure 12:
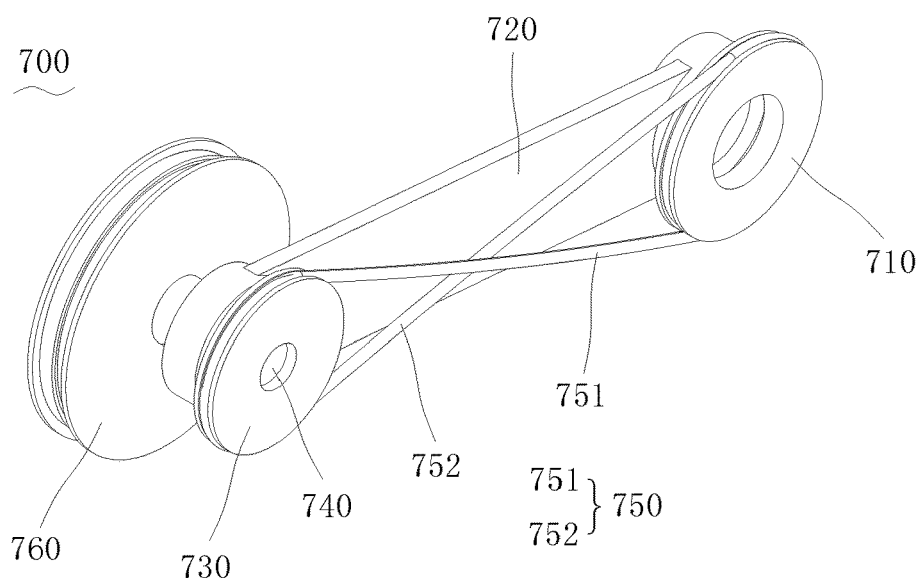
FIG. 12 is a schematic structural diagram from another perspective of FIG. 11.
Figure 13:
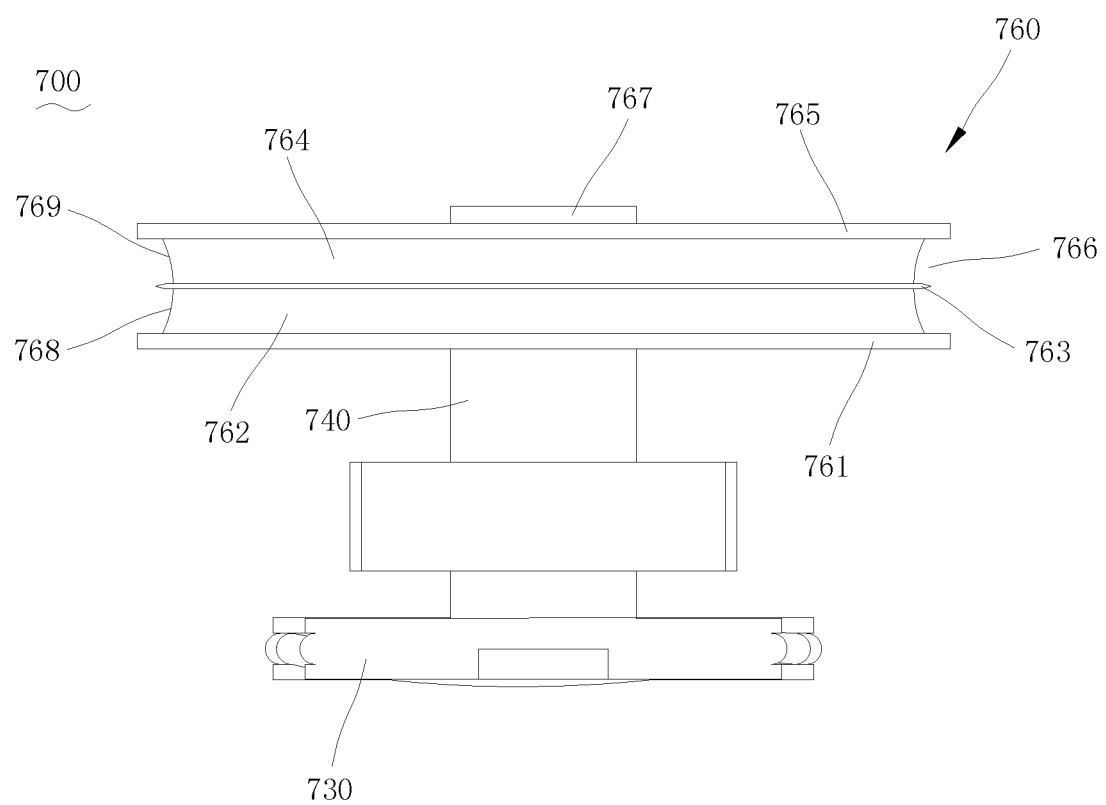
FIG. 13 is a cross-sectional side view of a cutting assembly in a shrimp peeling device according to a preferred embodiment of the present disclosure.

As another equivalent embodiment, as shown in FIG. 5, the longitudinal section of the first pathway 610 is V-shaped. That is, the first side wall surface 630 and the second side wall surface 640 are provided inside the clamping frame 600. The bottom end of the first side wall surface 630 and the bottom end of the second side wall surface 640 are inclined toward the inner side of the first pathway 610 to define a V shape. Therefore, the conveying belt 500 is also limited and bent upwards to form the V shape. Because the width of sections 1-5 of the shrimp is larger than that of sections 6-7, and the first pathway 610 is set in a V shape having a narrower bottom end, the conveying belt 500 clamps and straightens the sections 1-5 of the shrimp. The shrimp is squeezed, such that the sections 6-7 of a tail portion are bent toward a direction where the shrimp is naturally bent, and the sections 6-7 of the narrower part of the shrimp are bent downward and located at the bottom of the V-shaped conveying belt 500, as shown in FIG. 10. Therefore, when the shrimp passes through the cutting assembly 700, only the sections 1-5 of the shrimp are cut, while the sections 6-7 of the shrimp are bent downward into the bottom of the V-shaped conveying belt 500 and are not cut. The boundary of cutting and non-cutting of the shrimp shell of the shrimp is between the sections 5-6, which is not an absolutely accurate boundary, such that back-opened phoenix-tailed prawn products with the sections 6-7 of shrimp shell retained can be processed in the subsequent shell removing stage.

Figure 6:
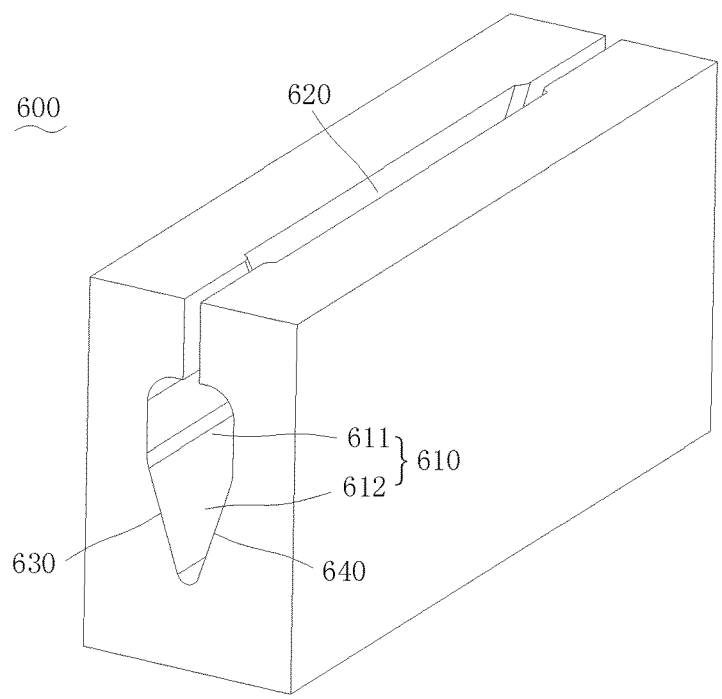
FIG. 6 is a stereoscopic schematic structural diagram of a clamping frame in a shrimp peeling device according to a third embodiment of the present disclosure.
Figure 7:
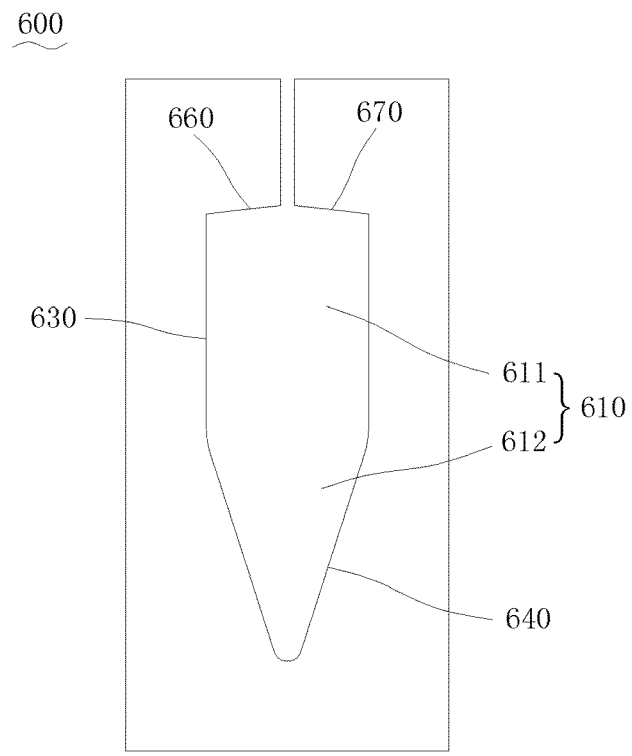
FIG. 7 is a cross-sectional side view of a clamping frame in a shrimp peeling device according to a third embodiment of the present disclosure.

As a third equivalent embodiment, as shown in FIG. 6 and FIG. 7, viewed along the longitudinal section of the first pathway 610, the first pathway 610 includes a first cavity 611 and a second cavity 612 sequentially communicated from top to bottom. The width of the first cavity 611 remains substantially the same from top to bottom, and the width of the second cavity 612 gradually decreases from top to bottom. The upper half section of the first side wall surface 630 and the upper half section of the second side wall surface 640 form a U shape similar to the first cavity 611, and the lower half section of the first side wall surface 630 and the lower half section of the second side wall surface 640 form a V shape similar to the second cavity 612, to define that the first pathway 610 is in a U-V shape. Therefore, the conveying belt 500 is also limited and bent upwards to form the U-V shape. Because the width of the sections 1-5 of the shrimp is larger than that of the sections 6-7, and the first pathway 610 is set in a V shape having a narrower bottom end, the conveying belt 500 clamps the sections 1-5 of the shrimp. The shrimp is squeezed, such that the sections 6-7 of the tail portion are bent toward the direction where the shrimp is naturally bent, and the sections 6-7 of the narrower part of the shrimp are bent downward and located at the bottom of the U-V-shaped conveying belt 500, i.e., located in the second cavity 612, as shown in FIG. 10. The first cavity 611 of the first pathway 610 is wider and therefore can accommodate the shrimp having a larger volume, and is more fitted with the shape of the shrimp to further widen the range of species of shrimps to be processed. Therefore, when the shrimp passes through the cutting assembly 700, only the sections 1-5 of the shrimp are cut, while the sections 6-7 of the shrimp are bent downward into the bottom of the U-V-shaped conveying belt 500 and are not cut. The boundary of cutting and non-cutting of the shrimp shell of the shrimp is between the sections 5-6, which is not an absolutely accurate boundary, such that back-opened phoenix-tailed prawn products with the sections 6-7 of shrimp shell retained can be processed in the subsequent shell removing stage.

In this embodiment, as shown in FIG. 4, a first top wall surface 660 extending toward the inner side of the first pathway 610 is provided at the top end of the first side wall surface 630, and a second top wall surface 670 extending toward the inner side of the first pathway 610 is provided at the top end of the second side wall surface 640 to surround the first pathway 610, thereby preventing the cutting assembly 700 during rotation from being taken away by the shrimp in the cutting process.

The first top wall surface 660 and the second top wall surface 670 are both arranged extending obliquely above the inner side of the first pathway 610, such that the first top wall surface 660 and the second top wall surface 670 are combined into a figure-eight shape, and the first pathway 610 has a larger conveying area for accommodating the shrimp, thereby improving the processing capability of the shrimp having a larger volume.

In this embodiment, as shown in FIG. 3, the processing opening 620 is shorter than a bracket body, is narrower than the first pathway 610, and is surrounded in all sides, such that the cutting assembly 700 only cuts the shrimp, cannot affect the conveying of the shrimp, and prevents the shrimp from being removed from an opening at the top end of the clamping frame 600 in the cutting process. The processing opening 620 is rectangular to facilitate the accommodation of a circular cutter head 760, and the height of the first pathway 610 is larger than the width of the first pathway 610, such that the shrimp can be clamped and conveyed in the vertical state.

Figure 8:
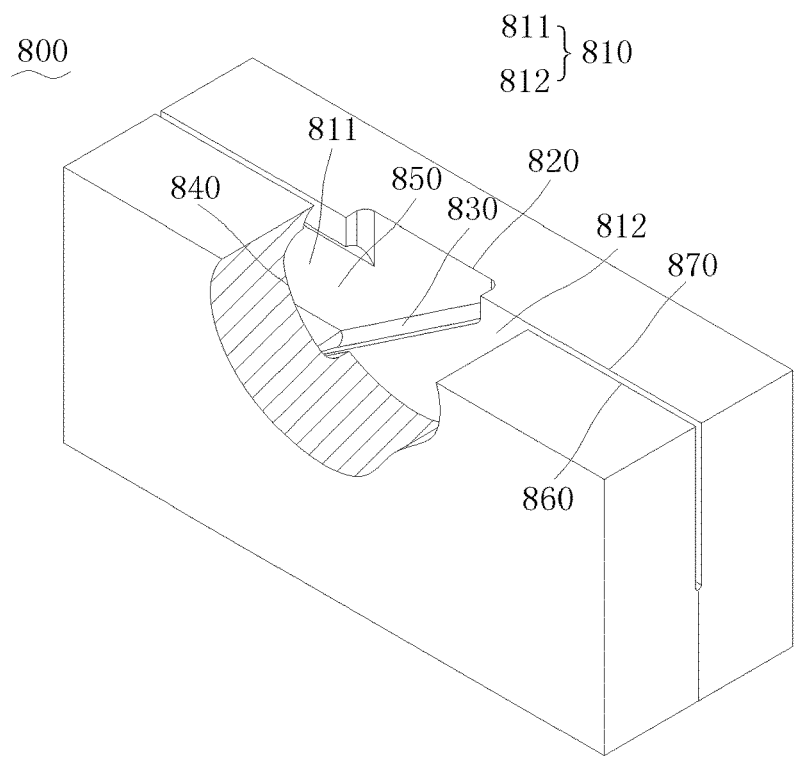
FIG. 8 is a partially sectional view of a shell removing frame in a shrimp peeling device according to a preferred embodiment of the present disclosure.
Figure 9:
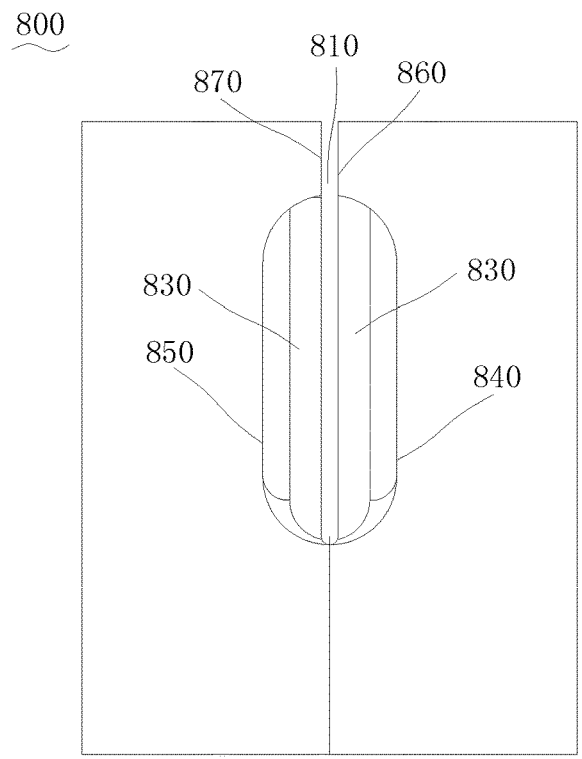
FIG. 9 is a cross-sectional side view of a shell removing frame in a shrimp peeling device according to a preferred embodiment of the present disclosure.

In this embodiment, as shown in FIG. 8 and FIG. 9, the limiting cavity 811 and the narrowing cavity 812 are connected through a guide surface 830, and the guide surface 830 is gradually inclined upward from back to front. After being cut, the shrimp is continuously conveyed, and is transited to the narrowing cavity 812 through the guide surface 830 for squeezing when passing through the connection between the limiting cavity 811 and the narrowing cavity 812, and then the shrimp meat is squeezed out. Under the action of an inertia force, the shrimp meat is ejected upwards along the guide surface 830 gradually inclined upwards and is conveyed outside through the discharge port 820. Finally, the peeled shrimp is collected.

A third side wall surface 840, a fourth side wall surface 850, a fifth side wall surface 860, and a sixth side wall surface 870 are provided inside the shell removing frame 800. The third side wall surface 840 and the fourth side wall surface 850 are relatively arranged to form the limiting cavity 811. The fifth side wall surface 860 and the sixth side wall surface 870 are relatively arranged to form the narrowing cavity 812 communicated with the limiting cavity 811. The third side wall surface 840 and the fifth side wall surface 860 are connected through the guide surface 830, and the fourth side wall surface 850 and the sixth side wall surface 870 are connected through the guide surface 830. The guide surfaces 830 on both sides narrow the left and right sides of the conveying belt 500 to improve the peeling capability to the cut shrimp. The width of the narrowing cavity 812 only allows the conveying belt 500 folded in half to pass through. The discharge port 820 is shorter than the limiting cavity 811, such that the front and rear ends of the discharge port 820 are surrounded to ensure that the shrimp meat can be discharged only from the discharge port 820. The limiting cavity 811 is as high as the narrowing cavity 812 to ensure that the conveying belt 500 can pass through the second pathway 810 along the horizontal direction.

Furthermore, the guide surface 830 may be an arc surface for transitional connection, such that the conveying belt 500 is subjected to transitional squeezing; and the guide surface 830 may also be in a stepped shape directly formed by flat surfaces, which is set according to the species of shrimps to be processed.

In this embodiment, as shown in FIG. 1, the discharge port 820 is provided with a guide plate 880 for guiding a shrimp collection direction. The shrimp meat is discharged from the discharge port after peeling, thereby obtaining an inertia force of moving to the front side. Therefore, the guide plate 880 stops and guides the shrimp to one side of the shell removing frame 800 for collection.

Furthermore, a collection plate 890 is provided on a side edge of the shell removing frame 800, and the collection plate 890 conveys the shrimp meat into a collection bucket, thereby implementing the collection of the shrimp meat.

In this embodiment, a support plate 900 mounted on the frame 100 is further included. The support plate 900 is located between the first conveying wheel 300 and the second conveying wheel 400. The shell removing frame 800 and the clamping frame 600 are arranged on the support plate 900 along the front and rear sides. By adjusting the position of the support plate 900, the position where the conveying belt 500 is bent upwards and folded in half is changed.

In this embodiment, as shown in FIG. 10 to FIG. 13, the cutting assembly 700 includes a first transmission wheel 710, a connection plate 720, a second transmission wheel 730, a transmission belt 750, and a cutter head 760. The first transmission wheel 710 is connected to the output end 210 of the driving member 200. One end of the connection plate 720 is rotatably connected to the output end 210 of the driving member 200 through a bearing seat. The second transmission wheel 730 is rotatably connected to the other end of the connection plate 720. The transmission belt 750 is in transmission connection between the first transmission wheel 710 and the second transmission wheel 730. The cutter head 760 is mounted on the second transmission wheel 730. The cutter head 760 is driven to cut by means of transmission. The connection plate 720 is rotatably connected to the output end 210 of the driving member 200. The cutter head 760 can slightly rotate with the output end 210 of the driving member 200 as the center, such that in the cutting process, the cutter head 760 can freely float up and down automatically along with the size and height of the shrimp, the cutting step is ensured not to be affected by the shrimp different in size, and fixed-depth back or abdomen opening by cutting can be implemented.

To ensure that the shrimp can be cut during conveying, the rotational speed of the cutter head 760 and the conveying speed of the conveying belt 500 need to have a certain differential speed, and the linear speed of the blade of the cutter head 760 is higher than the conveying speed of the conveying belt 500, or the rotational direction of the cutter head 760 is opposite to the conveying direction of the conveying belt 500.

In this embodiment, the structure in which the rotational direction of the cutter head 760 is opposite to the conveying direction of the conveying belt 500 is used, and a same driving member 200 is configured to operate the conveying belt 500 and the cutter head 760 at the same time, such that the structure is simpler and more compact. The transmission belt 750 includes a first transmission section 751 and a second transmission section 752 sequentially connected end to end, both the first transmission section 751 and the second transmission section 752 are in transmission connection with the first transmission wheel 710 and the second transmission wheel 730, and the first transmission section 751 and the second transmission section 752 are arranged in an intersection manner between the first transmission wheel 710 and the second transmission wheel 730. That is, opposite cutting relative to the conveying belt 500 is implemented through the transmission belt 750 arranged in an intersection manner, thereby achieving a better cutting effect.

It can be understood that the operation of the conveying belt 500 and the cutter head 760 can also be controlled by different driving sources, which is not limited in the present disclosure.

In this embodiment, the second transmission wheel 730 is provided with a rotation shaft 740 connected to the cutter head 760, and the other end of the connection plate 720 is rotatably connected to the rotation shaft 740 through a bearing seat. The cutter head 760 includes a first limiting plate 761, a first base plate 762, a cutting knife 763, a second base plate 764, and a second limiting plate 765 sequentially arranged along an axial direction of the rotation shaft 740. A diameter of the first limiting plate 761 and a diameter of the second limiting plate 765 are both larger than a diameter of the first base plate 762 and a diameter of the second base plate 764, such that an outer edge of the first limiting plate 761, an outer edge of the second limiting plate 765, an outer edge of the first base plate 762, and an outer edge of the second base plate 764 form an annular groove 766 for accommodating an object to be cut. in the cutting process, the shrimp enters the annular groove 766, and the first base plate 762 and the second base plate 764 abut against the shrimp. The first base plate 762 and the second base plate 764 are detachably connected to the rotation shaft 740, and a diameter of the cutting knife 763 is larger than the diameter of the first base plate 762 and the diameter of the second base plate 764, such that a blade of the cutting knife 763 extends to the annular groove 766. The protruding width of the blade of the cutting knife 763 relative to the annular groove 766 is a cutting knife depth of the shrimp, to implement fixed-depth cutting of the shrimp. Moreover, by replacing the first base plate 762 and the second base plate 764 of different specifications, the cutting knife depth of the cutter head 760 can be changed, and the application range is wider.

Furthermore, one end of the rotation shaft 740 is connected to the second transmission wheel 730, a fixed element 767 is detachably arranged at the other end of the rotation shaft 740, the first limiting plate 761 is fixedly arranged on the rotation shaft 740, the second limiting plate 765 is detachably connected to the rotation shaft 740, and the second limiting plate 765 abuts against the fixed element 767. The mounting position of the second limiting plate 765 is adjusted through the fixed element 767, such that the second limiting plate 765 is pressed against the first limiting plate 761 to clamp the first base plate 762 and the second base plate 764, thereby quickly disassembling and mounting the cutter head 760. The fixed element 767 is threadedly connected to the rotation shaft 740, such that disassembly is facilitated, and stability is high.

Furthermore, the diameter of the cutting knife 763 is smaller than the diameter of the first limiting plate 761 and the diameter of the second limiting plate 765, that is, the blade of the cutting knife 763 is surrounded inside the annular groove 766, thereby achieving a protection effect, achieving higher safety, and preventing operators from accidentally injuring during working. In addition, the diameter of the first limiting plate 761 is equal to the diameter of the second limiting plate 765, to achieve a limiting effect on the left and right sides of the shrimp. The diameter of the first base plate 762 is equal to the diameter of the second base plate 764, to ensure that the back of the shrimp can abut against the first base plate 762 and the second base plate 764 at the same time, thereby better jacking up the cutter head 760, and achieving an effect of freely floating up and down.

Furthermore, a first arc surface 768 recessed inwardly is provided on a side of the first base plate 762 close to the cutting knife 763, and a second arc surface 769 recessed inwardly is provided on a side of the second base plate close to the cutting knife 763, such that a longitudinal section of a shape formed by combining the first arc surface 768 and the second arc surface 769 is similarly semiarc-shaped, which is better fitted with the arc shape of the back of the shrimp, thereby improving the cutting stability and ensuring the cutting quality.

The shrimp peeling device according to this embodiment has the following working principle: the shrimp is placed on the conveying belt 500; when passing through the first pathway 610, the shrimp is clamped and conveyed in the vertical state; when passing through the processing opening 620, the shrimp jacks up the cutter head 760 for floating up and down, and the middle of the back of the shrimp is cut by the cutting knife 763; after cutting is completed, the shrimp is continuously carried to the shell removing frame 800 by the conveying belt 500; when passing through the narrowing cavity 812, the shrimp is squeezed by the conveying belt 500, and the shrimp meat is squeezed out by the belt and discharged from the discharge port 820 at the top to obtain the peeled back-opened shrimp; the shrimp meat falls into the shrimp meat collection bucket through the guide plate 880; the shrimp shell is clamped by the conveying belt 500 to pass through the narrowing cavity 812; and finally, along with unfolding of the conveying belt 500, the shrimp shell falls off.

In conclusion, the shrimp peeling device provided in the above embodiment of the present disclosure has the following advantages: (1) the shrimp is conveyed vertically through cooperation between the conveying belt 500 and the first pathway 610; (2) the connection plate 720 can implement up-down floating of the cutter head 760, which is not affected by the size difference of the shrimp in the cutting process, and the fixed-depth cutting can be implemented; (3) the cutting knife depth can be adjusted through the first base plate 762 and the second base plate 764 that can be replaced; (4) the narrowing cavity 812 can narrow the conveying belt 500 to squeeze the cut shrimp to obtain the peeled shrimp; and (5) it is not necessary to position the shrimp in the entire process, the structure is simple, the production cost is low, and the production efficiency can be greatly improved.

The above are only preferred implementations of the present disclosure. It should be noted that several improvements and replacements may further be made by a person of ordinary skill in the art without departing from the principle of the present disclosure, and such improvements and replacements should also be deemed as falling within the protection scope of the present disclosure.

The invention claimed is:

1. A shrimp peeling device, comprising:
   a frame;
   a driving member configured to provide a driving force and mounted on the frame;
   a first conveying wheel connected to an output end of the driving member and mounted on the frame;
   a second conveying wheel mounted on the frame;
   a conveying belt in transmission connection with the first conveying wheel and the second conveying wheel;
   a clamping frame provided with a first pathway for the conveying belt to pass through from back to front, a processing opening communicated with the first pathway being formed in a top end of the clamping frame, wherein when the conveying belt passes through the first pathway, two sides of the conveying belt are bent upward towards each other to clamp and convey a shrimp in a vertical state;
   a cutting assembly provided at the processing opening and extending into the first pathway to open a back or an abdomen of the shrimp clamped by the conveying belt; and
   a shell removing frame located on a front side of the clamping frame and provided with a second pathway for the conveying belt to pass through from back to front, the second pathway comprising a limiting cavity and a narrowing cavity sequentially communicated from back to front, the narrowing cavity being narrower than the limiting cavity, a discharge port being formed in a top end of the shell removing frame, and the discharge port being located at a connection position between the limiting cavity and the narrowing cavity and communicated with the limiting cavity, wherein when the conveying belt passes through the connection position between the limiting cavity and the narrowing cavity, the narrowing cavity narrows the conveying belt to squeeze the shrimp to obtain shrimp meat outputted through the discharge port and a shrimp shell carried away through the conveying belt.

2. The shrimp peeling device according to claim 1, wherein a longitudinal section of the first pathway is U-shaped.

3. The shrimp peeling device according to claim 1, wherein a longitudinal section of the first pathway is V-shaped.

4. The shrimp peeling device according to claim 1, wherein viewed along a longitudinal section of the first pathway, the first pathway comprises a first cavity and a second cavity sequentially communicated from top to bottom, a width of the first cavity remains substantially the same from top to bottom, and a width of the second cavity gradually decreases from top to bottom.

5. The shrimp peeling device according to claim 1, wherein the limiting cavity and the narrowing cavity are connected through a guide surface, and the guide surface is gradually inclined upward from back to front.

6. The shrimp peeling device according to claim 1, wherein the cutting assembly comprises:
   a first transmission wheel connected to the output end of the driving member;
   a connection plate provided with one end rotatably connected to the output end of the driving member;
   a second transmission wheel rotatably connected to the other end of the connection plate;
   a transmission belt in transmission connection between the first transmission wheel and the second transmission wheel; and
   a cutter head mounted on the second transmission wheel.

7. The shrimp peeling device according to claim 6, wherein the transmission belt comprises a first transmission section and a second transmission section sequentially connected end to end, both the first transmission section and the second transmission section are in transmission connection with the first transmission wheel and the second transmission wheel, and the first transmission section and the second transmission section are arranged in an intersection manner between the first transmission wheel and the second transmission wheel.

8. The shrimp peeling device according to claim 6, wherein the cutting assembly is provided with a rotation shaft connected to the second transmission wheel; and
   the cutter head comprises a first limiting plate, a first base plate, a cutting knife, a second base plate, and a second limiting plate sequentially arranged along an axial direction of the rotation shaft, a diameter of the first limiting plate and a diameter of the second limiting plate are both larger than a diameter of the first base plate and a diameter of the second base plate, such that an outer edge of the first limiting plate, an outer edge of the second limiting plate, an outer edge of the first base plate, and an outer edge of the second base plate form an annular groove for accommodating an object to be cut, and the first base plate and the second base plate are detachably connected to the rotation shaft, and a diameter of the cutting knife is larger than the diameter of the first base plate and the diameter of the second base plate, such that a blade of the cutting knife extends to the annular groove.

9. The shrimp peeling device according to claim 8, wherein a rotational direction of the cutter head is opposite to a conveying direction of the conveying belt.

10. The shrimp peeling device according to claim 8, wherein the diameter of the cutting knife is smaller than the diameter of the first limiting plate and the diameter of the second limiting plate.

11. The shrimp peeling device according to claim 8, wherein one end of the rotation shaft is connected to the second transmission wheel, a fixed element is detachably arranged at the other end of the rotation shaft, the first limiting plate is fixedly arranged on the rotation shaft, the second limiting plate is detachably connected to the rotation shaft, and the second limiting plate abuts against the fixed element.

12. The shrimp peeling device according to claim 8, wherein a first arc surface recessed inwardly is provided on a side of the first base plate close to the cutting knife, and a second arc surface recessed inwardly is provided on a side of the second base plate close to the cutting knife, such that a longitudinal section of a shape formed by combining the first arc surface and the second arc surface is semiarc-shaped.

13. The shrimp peeling device according to claim 1, further comprising a support plate mounted on the frame, wherein the support plate is located between the first conveying wheel and the second conveying wheel, and the clamping frame is disposed on the support plate.

* * * * *